(12) United States Patent
White (10) Patent No.: US 8,762,826 B2
(45) Date of Patent: Jun. 24, 2014

(54) ORGANIZATION AND DESIGN SYSTEM AND ONLINE COMMUNITY FOR IMAGES

(76) Inventor: Blayne White, Cumming, GA (US)

( * ) Notice: Subject to any disclaimer, the term of this patent is extended or adjusted under 35 U.S.C. 154(b) by 43 days.

(21) Appl. No.: 13/275,719

(22) Filed: Oct. 18, 2011

(65) Prior Publication Data

US 2012/0096337 A1 Apr. 19, 2012

Related U.S. Application Data

(60) Provisional application No. 61/394,191, filed on Oct. 18, 2010.

(51) Int. Cl.
*G06F 17/22* (2006.01)
*G06F 17/30* (2006.01)

(52) U.S. Cl.
USPC ............ 715/202; 715/205; 715/234; 707/740

(58) Field of Classification Search
USPC ......... 715/200, 201, 202, 204, 205, 206, 210, 715/234, 273, 751, 753, 760, 762
See application file for complete search history.

(56) References Cited

U.S. PATENT DOCUMENTS

| | | | |
|---|---|---|---|
| 7,290,950 B2* | 11/2007 | Donahoe et al. | 400/76 |
| 7,839,534 B2* | 11/2010 | Ueda et al. | 358/1.18 |
| 2002/0180203 A1* | 12/2002 | McIntyre et al. | 281/22 |
| 2004/0194034 A1* | 9/2004 | Vlamis | 715/530 |
| 2005/0165726 A1* | 7/2005 | Kawell et al. | 707/1 |
| 2012/0016892 A1* | 1/2012 | Wang et al. | 707/752 |
| 2012/0179571 A1* | 7/2012 | Grosso, III | 705/26.5 |
| 2012/0188405 A1* | 7/2012 | Morrison et al. | 348/231.2 |
| 2012/0226663 A1* | 9/2012 | Valdez Kline et al. | 707/640 |

* cited by examiner

*Primary Examiner* — Maikhanh Nguyen (57) ABSTRACT

A method and system for a single integrated computerized scrapbook system operable on a computing device connected to the Internet for providing a single integrated online scrapbooking solution, the system provides a method for storing and manipulating digital images on a computer. The application provides a user with tools for collecting, processing and cataloging digital and supply inventory. The user is able to combine the digital images, digital inventory and supply inventory in a manner for creating new digital projects. Finally, the user may print, publish or share the new digital projects, digital inventory and supply inventory via an online community.

6 Claims, 7 Drawing Sheets

ORGANIZATION AND DESIGN SYSTEM AND ONLINE COMMUNITY FOR IMAGES

CROSS REFERENCE TO RELATED PATENT APPLICATIONS

This application claims the benefit under 35 U.S.C. §119 to Provisional Application Ser. No. 61/394,191, entitled "Organization System And Online Community For Images," filed Oct. 18, 2010, the entire contents of which is hereby incorporated by reference.

BACKGROUND OF THE INVENTION

1. Field of the Invention

This invention relates generally to the field of electronic scrapbooking. More specifically, the invention relates to a single, software-based workflow and interactive on-line community for organizing, storing, creating, editing, and printing digital photographs, digital scrapbooking design kits and elements, and digital scrapbooking projects.

2. Background

Scrapbooking is an ages-old hobby that can be traced back to as late as the $15^{th}$ century in England. It began as a method for preserving personal and family history in the form a scrapbook. It is called a "scrapbook" because various memorabilia were glued to blank pages in a book including photographs, letters, cards, recipes, artwork, news paper clippings, quotations, etc. The scrapbook albums are also often decorated with family artwork, family crests and or family seals. Many scrapbooks contain personal or family journals along with the various memorabilia. Older scrapbooks tend to have photos mounted with photo-mounting corners and perhaps notations of who was in photo or where and when the photo was taken. All of this done to preserve the personal or family history of the scrapbook artist.

With the advent of personal computers, scanners, desktop publishing, page layout programs, and advanced printing options, it is relatively easy to create professional-looking scrapbook layouts in digital form. Furthermore, the Internet allows scrap bookers to self-publish their work or easily share it with family and friends. Scrapbooks that exist completely in digital image form are referred to as "digital scrapbooks" or "computer scrapbooks." While some people prefer the physicality of the actual artifacts they paste onto the pages of books, the digital scrapbooking hobby has grown in popularity in recent years. Some of the advantages include a greater diversity of materials, less environmental impact, cost savings, the ability to share finished pages more readily on the internet, and the use of image editing software to experiment with manipulating page elements in multiple ways without making permanent adjustments. A traditional scrapbook layout may employ a background paper with a torn edge. While a physical page can only be torn once and never restored, a digital paper can be torn and untorn with ease, allowing the scrapbooker to try out different looks without wasting supplies. Some web-based digital scrapbooks include a variety of wallpapers and backgrounds to help the users create a rich visual experience. Each paper, photo, or embellishment exists on its own layer in your document, and a user can reposition them at their discretion.

While there are a number of applications for editing and organizing digital images, adding themes or backgrounds, or doing page layout; there is not a "total" scrapbooking solution for the scrapbook artist. What is needed in a digital application that addresses all of the needs of a scrapbook artist, including organizing, storing and editing digital photographs; page layout; digital and physical inventory management; publishing; online collaboration and retail trade with other artists and backup storage.

SUMMARY OF THE INVENTION

Embodiments of the invention generally provide a method for digital scrapbooking within a single system. The method includes a system for storing and editing digital images. The method also includes a system for organizing and working with a digital inventory. Embodiments of the invention further includes systems and methods for organizing and working with a users physical supply inventory. All of this combines to allow a user to create new digital projects using the system. In addition, a user can collaborate and share their digital scrapbooking projects and resources in an online community.

Further embodiments of the invention include an integrated computerized scrapbook system for use on and in connection with a computing device connected to the Internet or other communications network, the system comprising, a method for storing and manipulating digital images in a computing environment. The invention includes a method for collecting, processing and cataloging digital inventory in a computing environment. Similarly, a method for collecting, processing and cataloging supply inventory in a computing environment is provided. Next a method for combining digital images, digital inventory and supply inventory in a manner for creating new digital projects. Finally, a method for sharing the new digital projects, digital inventory and supply inventory in an online community via a network is provided.

Various objects, features, aspects and advantages of the present invention will become more apparent from the following detailed description of preferred embodiments of the invention, along with the accompanying drawings in which like numbers represent like components.

DETAILED DESCRIPTION OF THE DRAWINGS

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention generally provides a simplified workflow that enables users to perform many tasks related to aspects of digital scrapbooking within a single complete system and online community instead of multiple, separate software programs.

The combination of all of the tools and resources that may be necessary for a scrapbooker are provided in a single system and online community. This may obviate the need to purchase and learn multiple software packages, and may also obviate the need to import and export data between multiple software programs, thus saving the scrapbooker time and money while allowing the scrapbooker more time to be creative.

Embodiments and features of the present invention may be implemented in a computer software program having a graphical user interface (GUI). The features of the present invention allow for the creation of a digital scrapbook that can be reproduced in printed hardcopy form, upload to a blog or website or shared with an online community. The present invention may be operable on a desktop computer, mobile or tablet computer, smart phone computer, or via a web browser in a cloud computing environment. Features and elements of the invention will be described in the descriptions of the drawings below.

Figure 1:
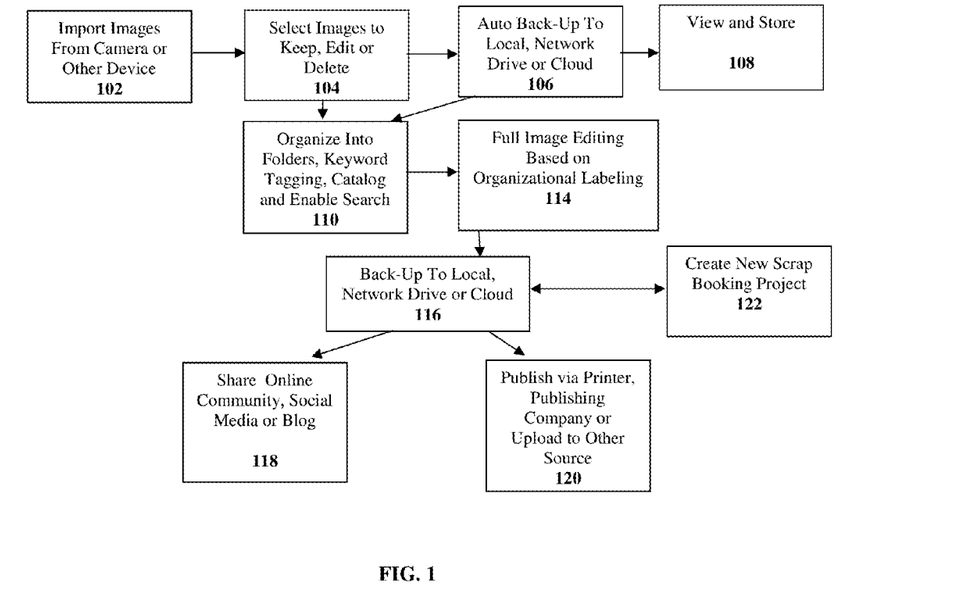
FIG. 1 shows a method provided for using a system to store and work with images in accordance with an embodiment of the present invention.
Figure 7:
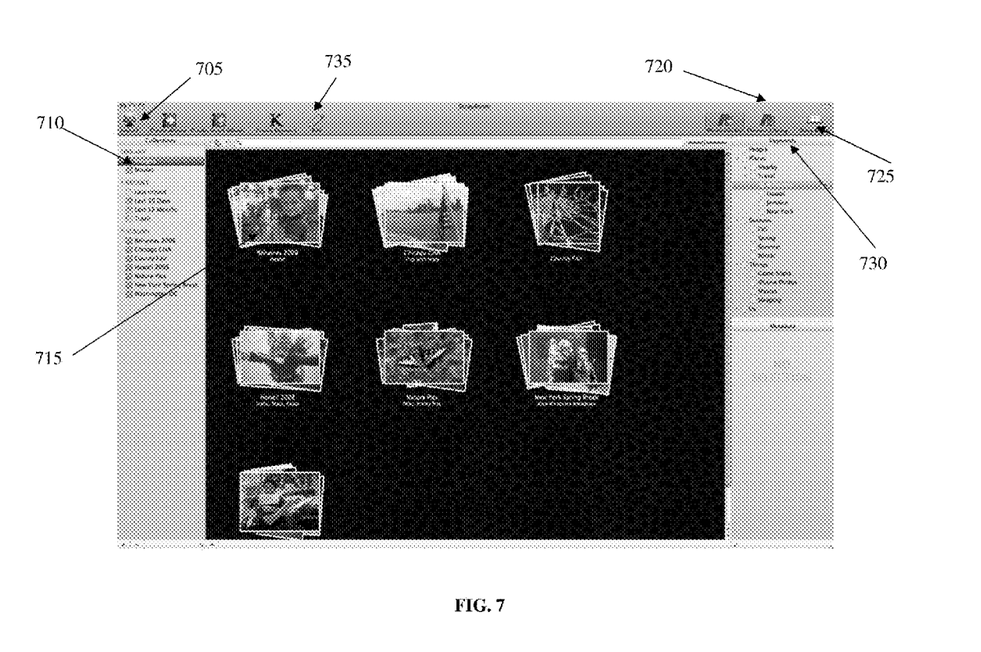
FIG. 7 is an illustration of a method for using the system to store and work with images, according to an embodiment of the invention.
Figure 8:
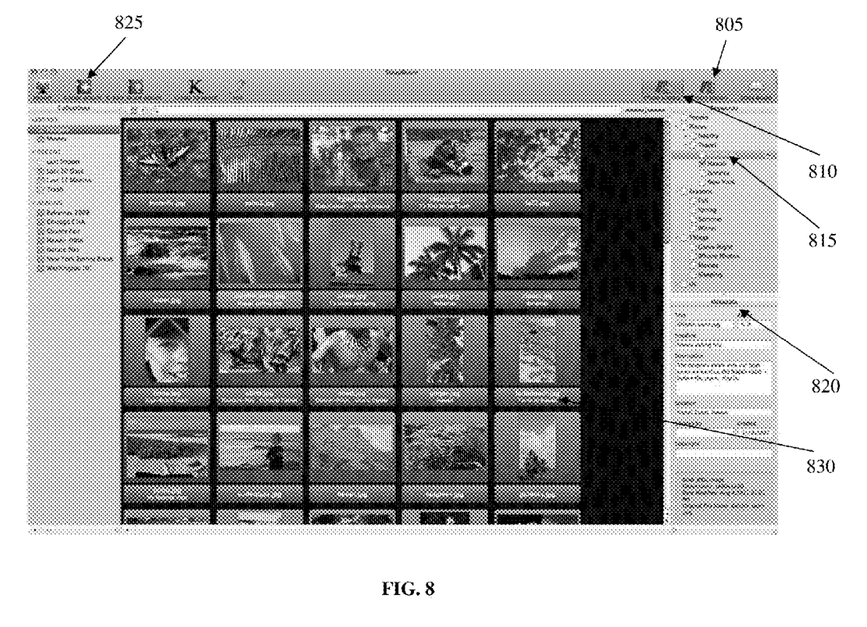
FIG. 8 is an illustration of a method for using the system to store and work with images, according to an embodiment of the invention.

FIG. 1, FIG. 7 and FIG. 8 shows a method provided for using the system to store and work with images. In step 805 a new digital album can be created. At 102, digital images 715 may be imported 705 from cameras or other devices, including mobile devices and any other devices capable of taking, processing or storing digital images. At 104, the images may be edited by rating the images to select favorites and by deleting unwanted images. At 106 and 810, the images may be backed up to local or online storage provided by the system. At 108, 710 and 830, the images may be viewed and selected for storage. At 110, 730 and 815, hierarchal keywords, dates, folders, or other information may be added to individual or multiple images in order to organize and catalog the images for searching and viewing. It will be understood by one of ordinary skill in the art that a keyword may be a date, location, event or category of the user's creating by which the user may search, sort, and organize the stored digital images. As illustrated in step 820, the addition of keyword tags allows the system to provide capabilities for users to perform searches for specific images via hierarchal keywords. At 114 and 735, the system may allow images to be edited via cropping, color changes, red eye removal, or any other functionality. In an embodiment of the invention, the user may apply the same changes or edits to all photographs that are collected into a grouping by a selected category. At 116, the system provides the users with the ability to back up these edited images. At 118, the system may allow the user to share images on the user's blog, via social media, or via an online community provided by the system or other photograph- or digital-media sharing Web site presence. At 120, the system provides printing options to allow the scrap book project to be published, printed out to a printer or uploaded to a print fulfillment company. At 122 and 725, the system may enable the creation of new digital projects (discussed below).

Figure 2:
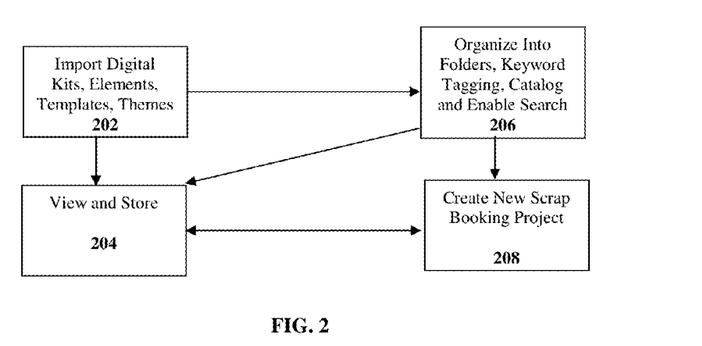
FIG. 2 shows a method for storing and working with digital inventory in accordance with an embodiment of the present invention.
Figure 9:
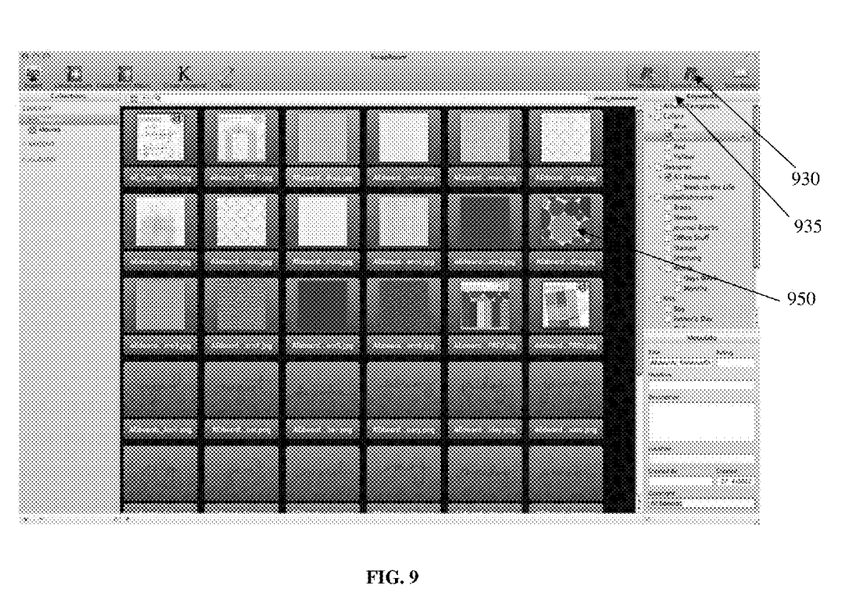
FIG. 9 is an illustration of a method for using the system to store and work with digital and supply inventory, according to an embodiment of the invention.

FIG. 2 and FIG. 9 shows a method for storing and working with digital inventory. At 202 and 930, digital inventory such as digital scrapbooking kits, elements, and templates from the user's personal collection or purchased from an online store and are imported into the application. At 204 and 950, the digital inventory can be viewed, organized and stored. At 206 and 935, the digital inventory may be tagged and cataloged with hierarchal keywords such as colors, kit names, designer names, themes, or any other suitable keywords. At 208 the system may enable the creation of new digital products (discussed below).

Figure 3:
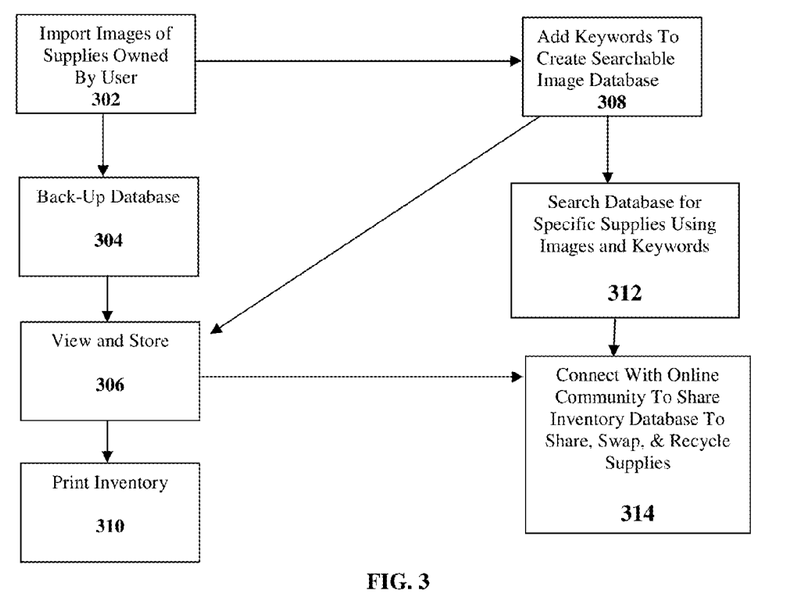
FIG. 3 shows a method for storing and working with supply inventory in accordance with an embodiment of the present invention.

FIG. 3 and FIG. 9 shows a method for storing and working with supply inventory. At 302, pictures of art supplies, such as stamps, paints, books, or any other supplies that the user wishes to catalog may be imported as inventory. At 304, the inventory is backed up to local or cloud based storage. At 306 and 950, the inventory is viewed, organized and stored. At 308, hierarchal keywords may be added to organize and enable searching of the stored inventory. At 310, a list of selected supplies within the inventory may be printed out for use as a shopping list. At 312, the list of supplies may be searched within a database shared by the online community comprising each user's supply inventory. User may select which supplies within their database that they wish to share with the online community. Users may agree to swap, barter, trade or purchase supplies form other users as they choose as shown in step 314.

Figure 4:
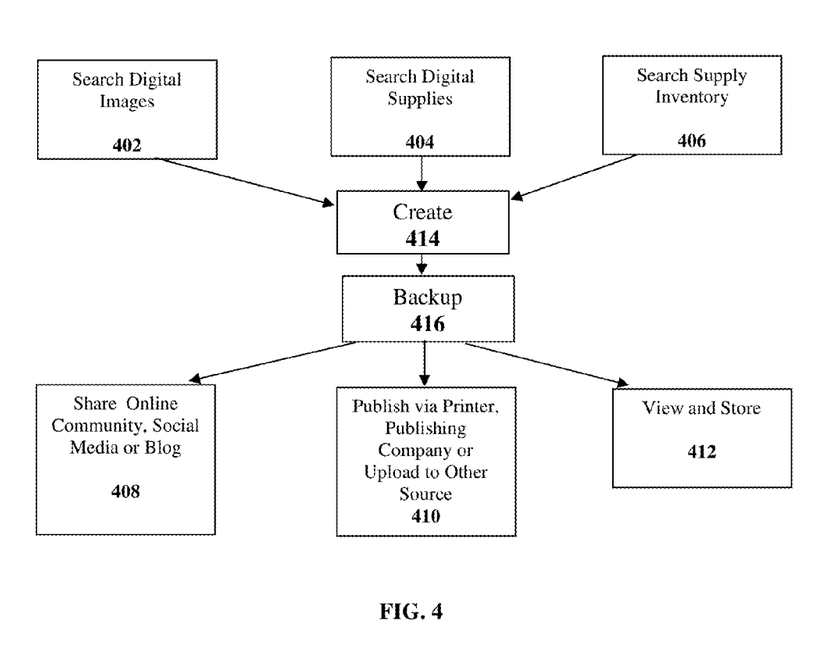
FIG. 4 shows a method for creating new digital projects in accordance with an embodiment of the present invention.
Figure 10:
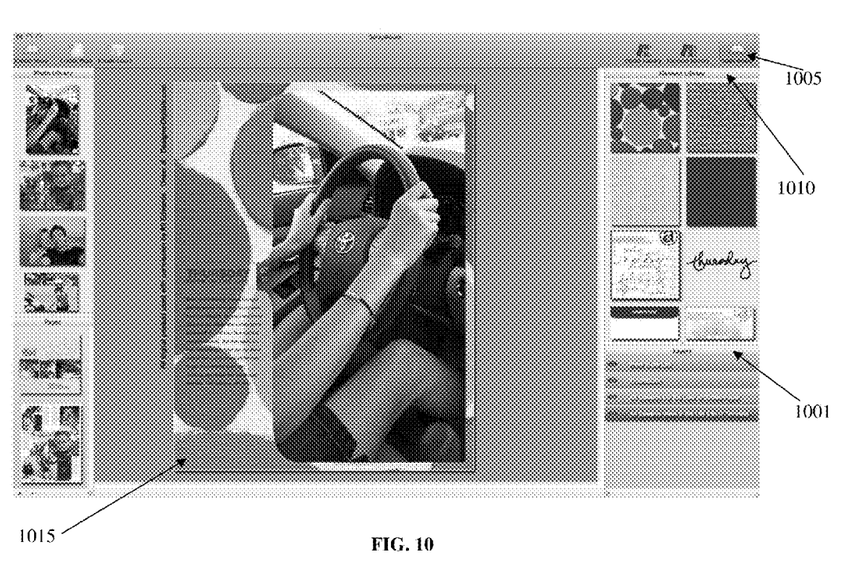
FIG. 10 is an illustration of a method for creating new digital products, according to an embodiment of the invention.

FIG. 4 and FIG. 10 shows a method for creating new digital projects. At 402, the user launches the application and can begin searching images, digital products, and/or supply inventory to select the items he or she wishes to work with. At 404 and 1001, a new project may be created by searching and using various digital supplies including layers, templates, images, photo editing tools, or any other media and/or tools, allowing the user to view, compile, and edit projects with photographs and other design kits and elements. At 406 and 1010, a user may also search the supply inventory of the online community to gather additional digital supplies that the user does not presently own. As described above, the user may acquire these supplies through a retail purchase, barter, swap, or other exchange. Once the user has selected all of the items the user wishes to work with, the user can begin creating the project in step 414. In step 416, the new project may be backed up. At 408 and 1015, the new project may be viewed using the system or the new project may be posted to a blog, social media website, or the online community for sharing with others. The user may also make their new project available for sale, trade, barter, etc. At 410, the system may enable images to be printed out to a printer or uploaded to a print fulfillment company. Finally, the project is saved in the database and is available to for viewing, editing and storage at the users discretion in step 412.

Figure 5:
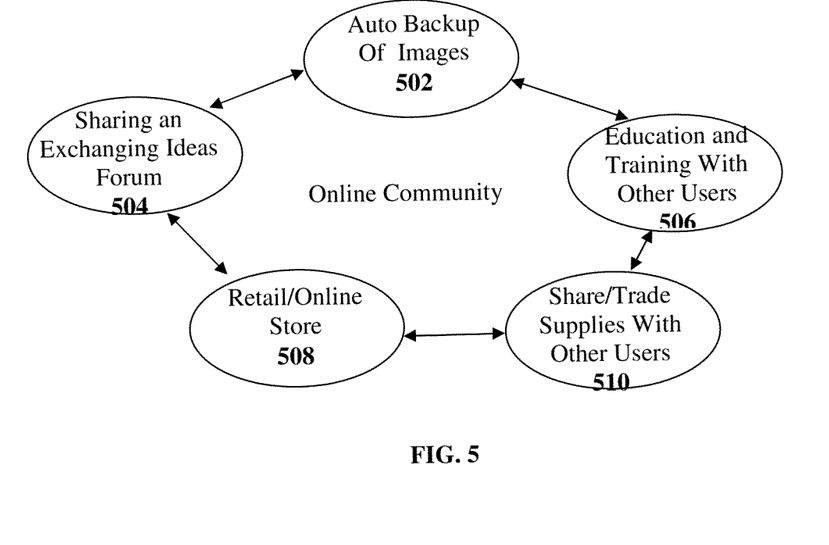
FIG. 5 shows a method of using an online community provided by a system in accordance with an embodiment of the present invention.

FIG. 5 illustrates a method of using an online community provided by the system. At 502 off-site storage and backup of user's digital files may be offered by the online community. The user may select which items are publicly available to the community and which items remain private to the user's collection. The user may also select which members or groups of members within the online community may be granted access to the user's files. At 504, the user may be allowed to upload their creations and/or ideas to the online community and the user may be able to share or garner feedback from other users on the online community. At 506, the online community may offer online tutorials about all components of the system. Some aspects of the online tutorials may be text, video, or live and interactive. Still in other embodiments, various members of the online community may host classes and presentations regarding their skill set in using the invention. At 508, the online community provides an online store for digital elements, art, and photography supplies. At 510, the online community may also allow the swapping and selling of unwanted supplies as well as the sharing of feedback between users. It will be understood that each user may create an on-line profile page as is common with any social networking site. Such a profile will facilitate interactions between users.

Figure 6:
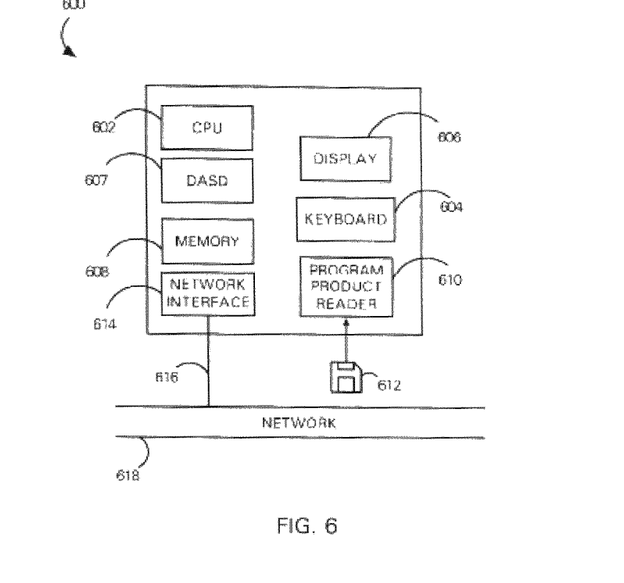
FIG. 6 is a block diagram of a computer system according to an embodiment of the invention.

FIG. 6 is a block diagram of an exemplary computer 600 providing an operating system having a graphical user interface capable of executing application instructions which produce the present invention. Each computer 600 operates under control of a central processor unit (CPU) 602, such as a microprocessor. A computer user can input commands and data from, from for example, a keyboard 604 and can view inputs and computer output at a display 606. The display is typically a video monitor, liquid crystal display and light emitting diode display. The computer 600 also includes a direct access storage device (DASD) 607, such as a hard disk drive or flash memory. The memory 608 typically comprises volatile semiconductor random access memory (RAM). Each computer preferably includes a program product reader 610 that accepts a program product storage device 612, from which the program product reader can read data (and to which it can optionally write data). The program product reader can comprise, for example, a disk drive, and the program product storage device can comprise a network connection, removable storage media such as a magnetic floppy disk, a CD-R disc, a CD-RW disc, or DVD disc. Each computer 600 can communicate with the others over the network through a network interface 614 that enables communication over a connection 616 between the network 618 and the computer. The network interface typically comprises, for example, a Network Interface Card (NIC) that permits communications over a variety of networks, such as the Internet.

The CPU 602 operates under control of programming steps that are temporarily stored in the memory 608 of the computer 600. When the programming steps are executed, embodiments of the invention described herein are produced. Thus, the programming steps implement the functionality of the invention as described in FIG. 1-FIG. 5. The programming steps can be received from the DASD 607, through the program product storage device 612, or through the network connection 616, wherein the application accessible via a browser and executes on a server. In an embodiment, the storage drive 610 can receive a program product 612, read programming steps recorded thereon, and transfer the programming steps into the memory 608 for execution by the CPU 602. As noted above, the program product storage device 612 can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 608 over the Internet network 618 in a cloud computing environment. In the internet network method, the computer receives data including program steps into the memory 608 through the network interface 614 after network communication has been established over the network connection 616 by well-known methods that will be understood by those skilled in the art without further explanation. The program steps are then executed by the CPU to implement the processing of the online community for images as disclosed in FIG. 1-FIG. 5.

It should be understood, of course, that the foregoing relates to exemplary embodiments of the invention and that modifications may be made without departing from the spirit and scope of the invention as set forth in the following claims. It will be further understood that the graphical interface may be customizable by the user based on desired functionality and editing elements.

I claim:

1. A system for digital scrapbooking comprising:
a computing device including a processor, said computing device is communicably linked to a computer network;
a storage device accessible by said computing device; and
software storing in said storage device, said software is executed by said computing device to:
create and maintain a plurality of digital images on said storage device by organizing and cataloging a plurality of digital images imported from at least one device capable of storing digital images;
create and maintain a digital inventory of digital products on said storage device by organizing and cataloging a plurality of digital kits, elements and templates associated with digital scrapbooking;
operate and maintain a website accessible via said computer network for making the contents of said storage device available to an online community comprising a supply inventory, wherein said website facilitates the searching of said plurality of digital images, said digital inventory and said supply inventory in said storage device, selecting at least one digital item from said plurality of digital images, said digital inventory and said supply inventory, and retrieving said at least one retrieved digital item from said storage device by members of said online community to create new digital scrapbooking projects,
wherein the creating and maintaining a plurality of digital images on said storage device comprises:
importing said plurality of digital images from at least one device capable of storing digital images;
rating the plurality of digital images;
deleting unwanted images from the plurality of digital images;
organizing and cataloging the plurality of digital images on said storage device;
searching the plurality of digital images on said storage device;
retrieving at least one of the plurality of digital images from said storage device;
editing at least one of the retrieved digital images; and
storing the edited digital images on said storage device.

2. The system of claim 1, wherein said device capable of storing digital images comprises a digital camera or mobile device.

3. The system of claim 1, wherein the step of rating the plurality of digital images comprises selecting favorite digital images.

4. The system of claim 1, wherein the step of organizing and cataloging the plurality of digital images comprises adding keywords to each of said plurality of digital images.

5. The system of claim 4, wherein said keywords comprise a date, location, or event associated with each of said plurality of digital images.

6. The system of claim 5, wherein the plurality of digital images are organized and cataloged according to said keywords.

* * * * *